March 26, 1957  H. A. MICHAELIS  2,786,929
COOKING APPLIANCE
Filed Nov. 22, 1954  3 Sheets-Sheet 1
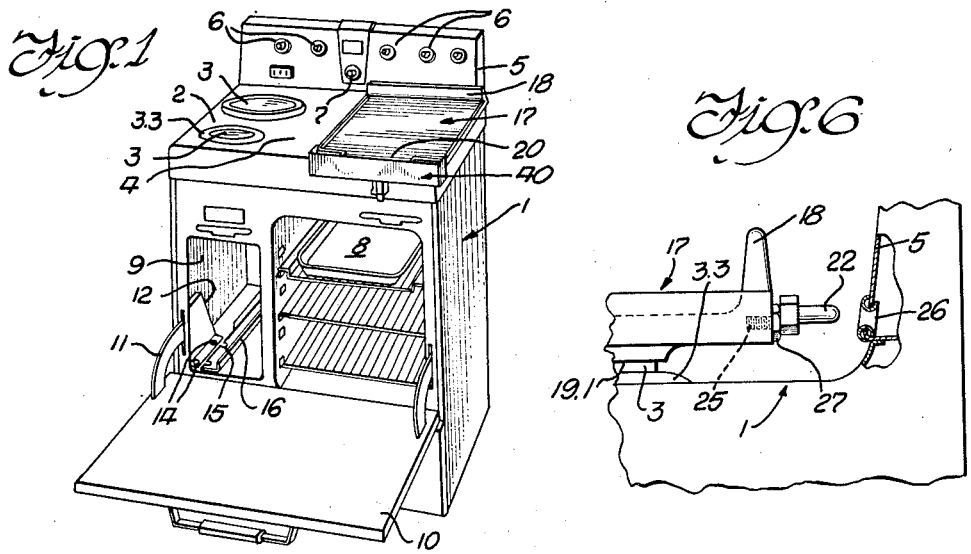
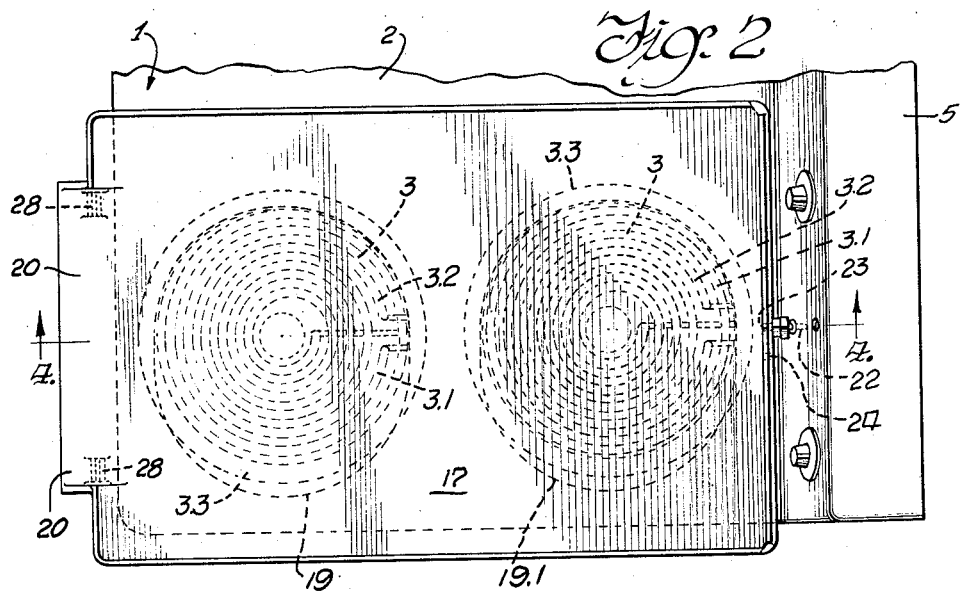
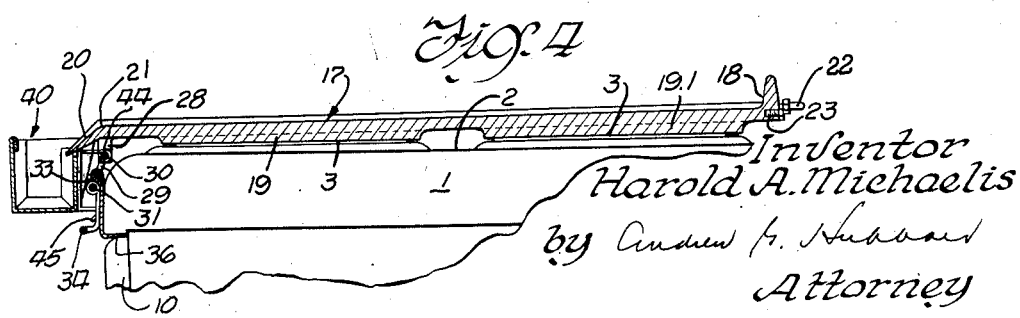
Inventor
Harold A. Michaelis
by Andrew F. Hubbard
Attorney March 26, 1957 H. A. MICHAELIS 2,786,929
COOKING APPLIANCE
Filed Nov. 22, 1954 3 Sheets-Sheet 2
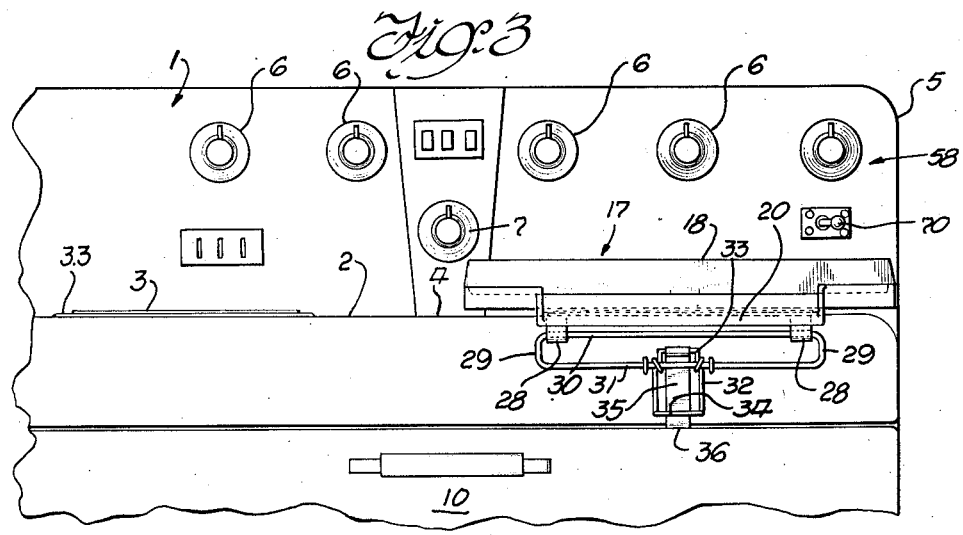
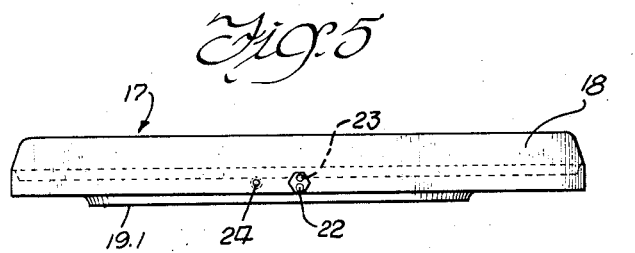
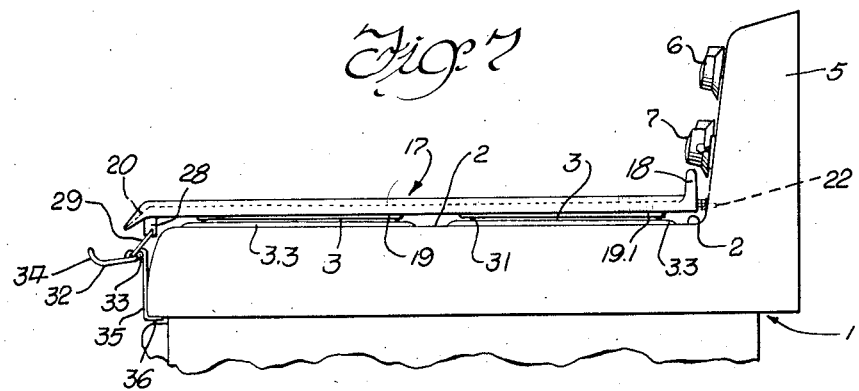
Inventor
Harold A. Michaelis
by Andrew H. Hubbard
Attorney March 26, 1957 H. A. MICHAELIS 2,786,929
COOKING APPLIANCE
Filed Nov. 22, 1954 3 Sheets-Sheet 3
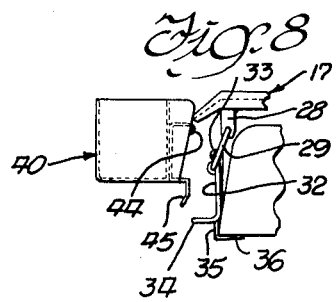
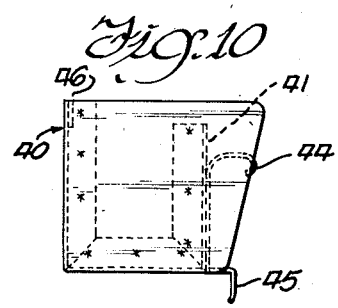
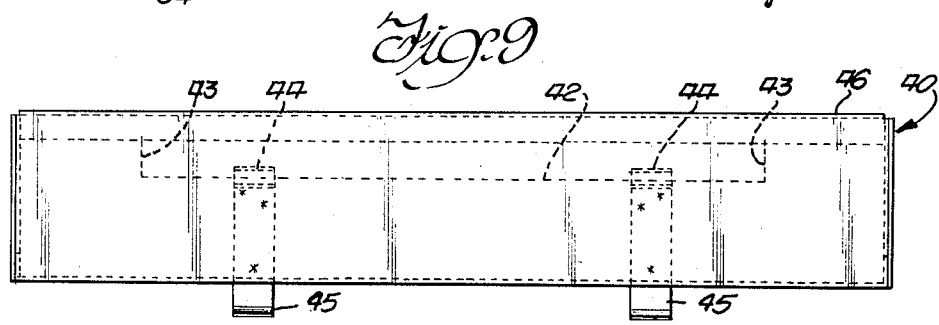
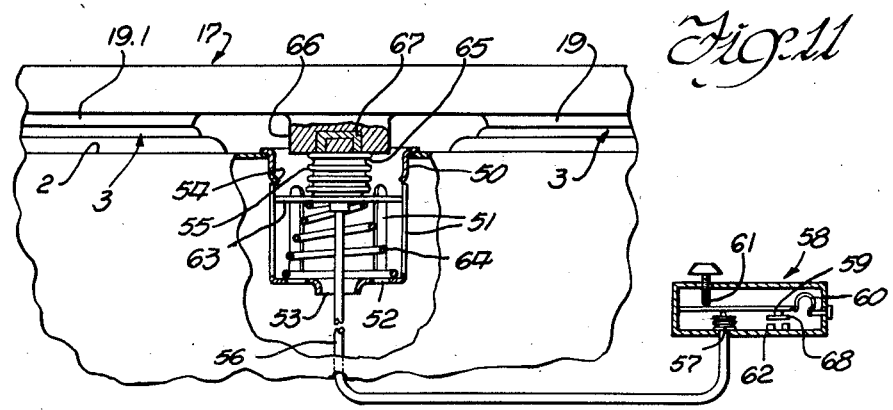
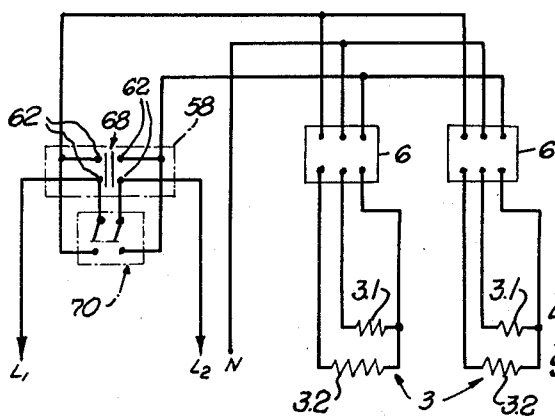
Inventor
Harold A. Michaelis
by Andrew L. Hubbard
Attorney United States Patent Office 2,786,929
Patented Mar. 26, 1957

2,786,929

COOKING APPLIANCE

Harold A. Michaelis, Elmhurst, Ill., assignor to General Electric Company, a corporation of New York Application November 22, 1954, Serial No. 470,258

17 Claims. (Cl. 219—37)

This invention relates to a cooking appliance, and in particular, to a cooking range and a detachable griddle therefor.

Small restaurants and other small-capacity commercial eating establishments frequently have a cooking range which is either a standard domestic range or a small size heavy duty cooking range. Because of lack of space, or economic considerations, the kitchen equipment of such establishments may not include a self-contained, automatic griddle, or may have griddling equipment with insufficient capacity to handle peak load requirements. It is well known that a large variety of menu items are best prepared on a griddle, and chef without adequate griddle equipment is forced to use a skillet or other makeshift appliance, with resultant inefficient preparation of the particular food items and inferior quality of the finished product.

It is therefore a principal object of the present invention to provide a griddle of large capacity which may be temporarily applied to the cooking surface of the cooking range, and will perform substantially as efficiently as a griddle of the self-contained or self-heated type, whereby at small expense the small restaurant kitchen may be provided with efficient griddling facilities.

It is another object of the invention to provide a griddle which may be quickly applied to the surface cooking units of a cooking range, and which when applied will be held securely thereon.

It is another object of the invention to provide a griddle having positioning and latching means which insure that the griddle is held in good heat transfer relation with the surface heating units of a cooking range, and will nevertheless be sufficiently yieldable and self-adjustable to protect an aluminum or other light-metal griddle against warping or other damage incident to high-temperature use.

It is a further object of the invention to provide an electric range and griddle in which the rate of heat loss from the griddle when idle equals the output of the heating element of the range at a predetermined switch setting, therefore permitting the griddle to remain safely in "standby" at a temperature at which it is always available for an occasional light load and may be brought quickly up to the requirements of a heavier cooking load.

It is still another object of the invention to provide a cooking range and detachable griddle having means for the thermostatic control of the griddle.

In a presently preferred embodiment of the invention, a substantially rectangular griddle is formed of cast or sheet aluminum or other light metal having good heat conduction. The cooking surface of the griddle slopes toward a lip at the front providing for the flow of grease into a detachable container extending below the front edge of the griddle and so mounted relative thereto that the container remains relatively cool. A positioning pin projecting from the rear wall of the griddle is removably received into an opening provided in the range backsplash portion, whereby the griddle may be accurately located with respect to the range surface units; and at the front, the griddle is provided with a resilient toggle latch which engages with a lower edge portion of the range cooking top. Proper pressure contact of the griddle against the heating elements of the cooking top is obtained by adjustment of the positioning pin and the resilience of the toggle latch. The resulting efficient heat transfer from the heating units to the griddle insures uniform heat distribution throughout the griddle, improves contact of the griddle with the sensing head of a thermostat, and permits expansion and contraction of the griddle, all as later explained.

In the accompanying drawings, which illustrate a presently preferred embodiment of the invention;

Fig. 1 is a perspective of an electric range showing a griddle mounted thereon, pursuant to the invention;

Fig. 2 is a top plan view of the griddle and a portion of the cooking range showing the griddle mounted in a first position on the range;

Fig. 3 is a front elevation of the griddle and a portion of the cooking range showing the griddle in a second position on the range;

Fig. 4 is a side section elevation of the griddle taken along lines 4—4 of Fig. 2, showing the grease cup in position and details of the securement latch;

Fig. 5 is a rear elevation of the griddle showing the two locations for mounting the positioning pin;

Fig. 6 is a fragmentary elevation of the rear portion of the griddle and the range cooking top with the range backsplasher in section at the location of the positioning hole for the griddle to show a preferred relationship of the positioning pin therewith;

Fig. 7 is a fragmentary side elevation of the griddle in position on the range top with the latching mechanism in unlatched position;

Fig. 8 is a fragmentary side elevation showing the latching mechanism in home position and the grease receptacle about to be positioned;

Figs. 9 and 10 are respectively a front and side elevation of the grease receptacle;

Fig. 11 is a fragmentary side sectional elevation of a second embodiment of a griddle and range showing a form of thermostatic control of the griddle; and Fig. 12 is a schematic wiring diagram for the thermostatic control.

In Fig. 1, the griddle is illustrated in application to an electric range 1 having the usual cooking top 2 on which are located a plurality of cooking units 3, which are arranged in front and rear locations at each side of the cooking top. The illustrated range is what is known as a "divided top" range in view of the fact that the respective front and rear pairs of cooking units are separated by a rather wide dividing space 4, on which in normal operation, the chef may rest pots, pans and the like (not shown). The backsplash 5 contains multi-position switches 6 individual to each of the surface cooking units to establish the desired thermal output of the surface units, a control knob 7 for adjustment of a conventional thermostat (not shown) for temperature control of the oven 8, and other control accessories as later described.

The surface cooking units 3 are advantageously of the flattened tubular sheathed type disclosed in Vallorani et al. Patent 2,662,158, granted December 8, 1953, for "Heating Unit and Method of Making the Same." As taught by the said patent, and as now well known in the art, each surface unit comprises two spirally arranged heating elements (see 3.1 and 3.2 shown in dotted outline in Fig. 2) which collectively provide a flat surface on which a pot, pan, or other conventional cooking utensil may be placed for direct heat transfer thereto. The heating elements are mounted on a spider (not shown) and are self-adjustable with respect thereto, as taught in the said Vallorani patent; and the spider of each surface heating unit is mounted in a support ring 3.3 carried by the cooking top 2. As is well known in the art (see, for example, Illian U. S. Patent 2,483,831, granted October 4, 1949, for "Electric Switch") the individual heating elements of the surface heating units may be controlled by an associated multi-position switch 6 and established thereby in various circuit relationships to provide a desired thermal output for each surface heating unit.

Purely by way of example, and assuming that the cooking range of Fig. 1 is connected to a three-wire, single phase Edison circuit providing a line-to-line voltage of approximately 236 volts, and line to neutral of approximately 118 volts, heating element 3.1 of each of the heating units shown in dotted line in Fig. 2 may have a rating of 1150 watts and heating element 3.2 thereof may have a rating of 900 watts. As best explained in said Illian patent, the thermal output for each of the surface heating units indicated in Fig. 2 may be established by the switch position of the particular unit as follows:

"*High.*"—Both elements of the unit in parallel across line voltage.

"*Second.*"—One element across line voltage; other element de-energized.

"*Third.*"—Both elements in series across line voltage.

"*Low.*"—One element across line and neutral, i. e., half line voltage.

"*Warm.*"—Both elements in series across half line voltage.

At the side of the oven 8, the range body provides a storage space 9 for cooking utensils (not shown) and a door 10, common to the oven and storage space, is mounted by means of a conventional hinge (not shown) to permit the door to be swung between its substantially horizontal open and substantially vertical closed positions. The oven door may advantageously include counterbalancing means such as described and claimed in Johnson U. S. Patent 2,447,341, granted August 17, 1948, for "Oven Door." Such counterbalancing means include cam members 11; and at least that cam member associated with the left-hand of the door, as viewed in Fig. 1, enters a housing 12 detachably secured to the base of compartment 9 by screws 14. Said screws when loosened permit the side edge of portion 15 of an upwardly-facing channel 16 to be inserted between the bottom of the housing 12 and the floor of the compartment 9, whereupon the channel 16 is made available as a storage rack facility for the griddle 17, which is advantageously cast from aluminum or other light metal having good thermal conductivity.

Considering the depth of the cooking top of the average cooking range, the griddle 17, see Figs. 2 and 4, may have a cooking surface measuring about 21 inches in depth and 13 inches in width. The griddle cooking surface is bounded by relatively low side walls, and a substantially higher rear wall 18. The bottom of the griddle is formed with integral bosses 19, 19.1 which rest upon the surface units 3 at the right-hand side of the range, as viewed in Fig. 2. The surface units of an electric range are in a common horizontal plane. To provide for drainage of grease to the front of the griddle, the bottom of the bosses 19, 19.1 is machined to have a gradual and uniform slope relative to the cooking surface of the griddle. As shown in Fig. 4, although a plane surface applied to the bottom of the respective bosses will be parallel to the cooking surface 2 of the range, the cooking surface of the griddle slopes toward the front; in a preferred embodiment, when the griddle is placed on the range with the bosses resting on the surface heating units, the machining of the bosses gives to the cooking surface a uniform slope toward the front of the griddle amounting to about 1/16 of an inch per foot.

As best appears in Fig. 2, the bosses are somewhat elliptical in outline. For example, in a range in which each of the surface units 3 over which the griddle is placed is eight inches in diameter exclusive of the trim ring 3.3, the left-hand portion of each boss, as viewed in Fig. 2, comprises a semi-circle of four inch radius centered on the front to rear centerline of the griddle; the right-hand portion of each boss comprises a semi-circle of four inch radius centered one inch to the right of said centerline. Each boss will therefore have a central portion comprising essentially a one-by-eight-inch rectangle. The significance of this elliptical shape will presently appear. The front end of the griddle is formed to provide the drainage lip 20, over which grease will flow into a suitable receptacle, as later described. I have found that the radius of the curvature 21 (Fig. 4) between the cooking surface of the griddle and the lip 20 should be at least of the order of 7/16 of an inch to provide for proper flow of grease from the cooking surface over the lip. Smaller radii make it possible for the surface tension of the grease to choke off the flow of grease, with the result that an effective dam is formed, with undesirable grease accumulation on the griddle cooking surface.

An important feature of the present invention comprises the method of securing the griddle to obtain optimum heat transfer from the surface units 3 to the body of the griddle, thus insuring good heat distribution throughout the griddle. The securement means provides for expansion and contraction of the griddle when in use, without warping the griddle or otherwise straining it.

The griddle is removably positioned on the range by means including the adjustable locating pin 22 which may be secured to the rear wall of the griddle by screwing it into either of two tapped openings 23, 24, as shown in Fig. 5. Opening 23 is on the centerline of the griddle, whereas opening 24 is one inch to the left of the centerline. Pin 22 is designed snugly to enter an opening 26 provided in the backsplasher 5 of the range, as shown in Fig. 6. Said opening 26 is in alignment with the geometric center of the surface units 3, as viewed in Fig. 2. When the pin 22 is adjusted and retained in adjusted position by its lock nut 27, its uppermost surface should be about 1/32 of an inch above the inner wall of the opening 26. By proper location of the opening 26 relative to the plane of the heating units 3, it will be seen that it will be necessary to urge the griddle down against the heating units in order to permit the pin 22 to enter the opening 26. With the pin 22 in opening 23, the griddle will be centered on the heating units. This gives the better distribution of heat and is the preferred location. However, the side edge of the griddle then projects about one inch over the side of the range body. If this relationship interferes with kitchen equipment placed against the side of the range, the user may secure the pin in the tapped opening 24, which will effectively move the griddle sufficiently left of Fig. 2 to line up with the range side wall. Such a relationship is shown in Fig. 3. The generally elliptical shape of the bosses 19 and 19.1 permits this relative positioning of the griddle while maintaining contact of the lower surface of the bosses with the entire heating surface of the heating units.

The securement of the griddle is completed by a resilient latch, best shown in Figs. 3, 7, and 8. In Fig. 3, it is seen that the griddle has two lugs 28. A bail 29 rotatably extends through said lugs and there are thus provided an upper cross bar 30 and a lower cross bar 31. A latching lever 32 which may be formed of heavy wire looped about cross bar 31 to provide a pivotal association therewith, has a lower portion 32 and an upper portion 33, thus forming a first degree lever. Advantageously, the lowermost portion 34 of lever member 32 is outwardly offset, see Fig. 7, to provide a convenient hand grip. A resilient latching link 35 is pivotally attached to the lever portion 33. Said link is preferably of resilient sheet metal and has an inwardly extending leg 36 which may be inserted beneath the bottom of the cooking top. It is seen in Figs.

5 and 6 that the centerline of the pin 22 is eccentric to the axis of its stud portion, whereupon the elevation of the pin relative to the bottom of bosses 19, 19.1 is readily adjustable. When the pin is properly adjusted, its insertion into the opening requires that the rear of the griddle be pressed down against the rear heating unit 3, whereupon the inherent resilience of the heating elements thereof maintains them firmly against the boss 19.1 of the griddle. This firm pressure is maintained, and the pressure of boss 19 against the front heating unit 3 established and maintained, by the latch 35 when it is moved to home position, as shown in Fig. 8. The toggle action of the latching lever 32 throws the latch 35 counterclockwise of Fig. 8, whereupon the latch will flex and maintain resilient pressure on the forward end of the griddle. The pressure is not great; at heavy duty griddling temperatures, in the range of 450° F., there is considerable strain on the griddle and strong pressure exerted by the latch might so restrict movement of the griddle as to permit the griddle to warp. A resilient latch permits lateral movement of the griddle under temperature change or otherwise, and minimizes the possibility of warpage. It is also a matter of experience that manufacturing variations in parts and assemblies may produce structural derangements which could not be tolerated if latching device were rigid.

Bar 30 provides a convenient support for a grease receptacle 40, best shown in Figs. 9 and 10. The receptacle comprises an elongated cup having a stepped rear wall 41, affording a low central portion 42 which fits beneath the lip 20 of the griddle. A wall portion 43 will engage the side of the lip to limit lateral displacement of the receptacle. Hook members 44 secured to the rear wall, provide for ready attachment to and removal from the bar 30. The hook members preferably have rearwardly and downwardly extending portions 45 which when the receptacle is in position will engage with the front wall of the range. The portions 45 maintain the receptacle upright, and steady it when the chef uses the front edge 46 of the receptacle against which to scrape and clean the spatula or other implement which he has used to clean the griddle. The receptacle has no direct contact with the griddle and minimum contact with the body of the range. The receptacle therefore remains cool enough to be handled with the bare hands even after prolonged usage of the griddle.

The heat radiating surface of the griddle, when it is operating without load in an ambient temperature of about 75° F. permits both heating units 3 to be maintained in service continuously on "low" heat (in which each heating unit has a thermal output of approximately 260 watts) without causing the griddle to rise substantially above 315° F. This is by no means an unsafe temperature level for an aluminum griddle, nor will the "seasoning" of the griddle surface be destroyed, as it would be after prolonged idle periods at a higher temperature. The griddle may therefore be maintained on a "standby" basis at a temperature sufficient for cooking light loads, such as an occasional order of scrambled eggs or the like, without increasing the thermal output of the heating elements. For heavier cooking loads, and loads requiring higher temperatures, the switches 6 may be set the necessary higher rating and the griddle will quickly rise to the increased temperature and heat requirements.

An important feature of the griddle construction is that the arrangement of bosses 19, 19.1 provides the necessary slope of the griddle surface while maintaining the major body portion of the griddle at uniform thickness, thus improving the heat distribution within the griddle. Except for the bosses 19, 19.1, the slope of the cooking surface could be obtained only by gradually changing the entire griddle body thickness. The bosses, being of substantial depth, space the bottom of the griddle well above the range surface 2, thus improving the heat radiation from the griddle while preventing overheating of the range surface.

Fig. 11 fragmentarily shows an embodiment of a griddle and range providing thermostatic control for the griddle. Portions of the griddle and range which are identical to those previously described have the same numbering. The range cooking top is fitted with a well 50 disposed intermediate the surface units 3 and in line with a common diameter thereof. Said well is substantially oval in plan with the long axis of the oval perpendicular to the common diametrical line of the heating elements. The well is preferably ventilated as by a suitable plurality of slotted openings 51 and has a number of bottom drainage openings 52 supplementing the central drainage passage 53. Tabs 54 at the upper ends of certain of the slotted openings may be bent inwardly to provide stops as later described. The well accommodates a temperature sensing element which is maintained in engagement with the bottom of the griddle. As shown, the temperature sensing element may comprise a small volume metal bellows 55 in communication with a conventional capillary tube 56 forming a conduit between the liquid in the bellows and the actuating element 57 of a conventional thermostat 58 which may be mounted on the backsplasher of the range or any other convenient location. Alternatively, of course, the heat sensing element may comprise the suitably configurated end of the conventional cylindrical thermostat bulb.

The thermostat has been schematically shown since of itself it is not a part of the present invention and there are many forms of conventional thermostats which may satisfactorily be used. A thermostat may comprise, for example, a resilient contact carrier 59 having an overthrow spring mechanism 60 at one end thereof, a manually adjustable setting screw 61 which controls the thermostat operating temperature by adjusting the spring bias of blade 59 relative to the actuator 57 and suitably insulated and arranged contacts 62 which are operated by carrier 59 to closed circuit position as the thermostat liquid in the sensing head 55, capillary 56, and actuator 57 responds to a drop in temperature of the griddle and to open circuit position as the temperature of the griddle increases beyond the operating point of the thermostat.

The sensing head 55 is mounted upon a suitable plate 63 which serves as a guide for axial movement of the head within the well 50 under the urging of a coil spring 64. The sensing head is capped with an iron or other magnetizable surface 65.

Griddle 17 is provided intermediate its bosses 19, 19.1, with an integral boss 66 having a machined bottom face. Said boss 66 is of oval configuration similar to that of the bosses 19, 19.1 so that regardless of the position of the griddle on the range cooking top, as previously described, the surface of the boss 66 will be in heat transfer relationship with the end of the sensing head. The oval configuration of the thermostat well 50 permits the shifting of the griddle without conflict of the boss 66 with the wall of the well 50. A high strength permanent magnet 67 may be press-fit or cast within the boss 66. The pole pieces of said magnet are machined at the time of machining of the boss 66 to insure precise alignment of the pole pieces with the surface of the boss. It will be apparent that when the griddle 17 is latched in operating position, as previously described, the spring 64 will urge the sensing head against the face of the boss 66. The attraction of the magnet 67 for the plate 65 at the end of the sensing head insures maximum surface contact of the sensing head with the griddle.

When the griddle 17 is removed from the range, the spring 64 will, of course, drive the sensing head upwardly to the point of engagement of the plate 63 with the tabs 54. A suitable cover (not shown) may be fitted over the well 50 for the protection of the thermostat sensing head when it is in inoperative position.

Disposing the sensing head in between the front and rear surface heating units makes it possible to use the thermostat as a means for roughly controlling the temperature of a large cooking vessel (not shown) having a bottom diameter sufficiently large to bring a portion of the vessel bottom over the thermostat sensing head. The spring 64 will maintain the sensing head in contact with the bottom of the vessel.

Fig. 12 schematically shows the wiring diagram for the control of the front and rear surface heating units by the griddle thermostat and means for taking the thermostat out of service when the griddle is not in position on said heating units. The respective surface units 3 are under primary control of the multi-position switches 6, pursuant to which the individual resistance coils of the surface units may be connected as previously noted. The actual connections between the heating units and the switches have not been detailed because of the complete disclosure thereof in the above noted Illian Patent 2,483,831.

Thermostat 58 is of the two pole, single throw type, and it will be understood that the bridging member 68 makes or breaks the pairs of contacts 62 simultaneously. Conductors L1 and L2 provide 236 volt alternating current at the lower pair of the contacts 62, as viewed in Fig. 12, and the upper pair of contacts 62 of the thermostat are respectively connected to the appropriate terminals of the switches 6 to place full voltage across said terminals when the thermostat is in closed circuit position. The neutral conductor "N" of the three-wire Edison circuit connects to the third terminal of the respective switches, as shown. It is apparent therefore that regardless of the selected closed circuit positions of the switches, the units 3 are under thermostatic control. A double pole, single throw switch 70 is arranged in shunt relation to the thermostat, and it will be obvious that when the switch is closed a direct path is provided for the connection of conductors L1, L2, to the control switches 6.

While there has been described what is at present considered to be the preferred embodiment of the invention, it will be understood that various modifications may be made therein, and it is intended to cover in the appended claims all such modifications as fall within the true spirit and scope of the invention.

I claim:

1. In combination, an electric cooking range having a body portion providing a cooking top, a plurality of substantially circular heating units for conventional surface cookery disposed on said cooking top and having operating surfaces disposed in substantially a common horizontal plane, at least two of said heating units being in alignment, and said body portion having an aperture adjacent one of said two heating units, a griddle disposed on said two heating units, said griddle having a boss individual to each heating unit, the bottom of said bosses being sloped relative to the griddling surface of said griddle to cause said griddling surface to incline uniformly toward one end of said griddle when the bosses are placed on the respective heating units, a rigid member projecting from said griddle and extending into said body portion aperture to draw a portion of said griddle downwardly for good heat transfer relation of one of said bosses with one of said two heating units, and latch means carried by said griddle remote from said rigid member and releasably engageable with said range body portion to draw the remainder of the griddle downwardly for good heat transfer relation of the other of said bosses with the second of said heating units.

2. The combination according to claim 1 in which said griddle bosses are substantially oval, with the major diameter of each said boss being at right angles to the longitudinal centerline of the griddle and the minor axis of each said boss being substantially equal to the diameter of its associated heating unit.

3. The combination according to claim 1 in which said rigid member may be optionally placed in either of two laterally spaced locations on said griddle, the separation of said locations being substantially equal to the dimensional difference between the major and minor axes of said elliptical bosses.

4. In combination, an electric cooking range having a body portion providing a cooking top, a plurality of substantially circular electrically energized surface cooking elements fixed on said cooking top and having operating surfaces disposed in substantially a common horizontal plane, means for establishing the thermal output of said heating elements at any one of a plurality of optionally selectable levels, at least two of said heating units being in alignment in parallel relation to the adjacent side wall of said range body portion, a griddle removably disposed on said two heating units, said griddle having a boss individual to each said heating unit, each of said bosses being of appreciable thickness and having an area at least equal to the area of the associated heating unit for complete coverage of the heating unit by the boss, the bottom of the respective bosses being sloped relative to the griddling surface of said griddle to cause said griddling surface to incline uniformly toward one end of said griddle when the bosses are positioned on the respective heating units, means disposed at one end of said griddle for releasable engagement with said range body portion to draw a portion of said griddle downwardly into good heat transfer relation of one of said bosses with one of said two heating units, and means disposed at the opposite end of said griddle for releasable engagement with said range body portion to draw another portion of said griddle downwardly into good heat transfer relation of the other of said bosses with the other of said heating units.

5. The combination according to claim 4 in which the heat radiating area of said griddle is such that with the respective two heating units operating at a predetermined thermal output, the griddle may be maintained at a continuous standby temperature of between 300 to 350° F.

6. In combination, a cooking range having a body portion providing a cooking top, an upstanding wall along one marginal edge of said cooking top, a plurality of heating units arranged in alignment with respect to said upstanding wall, said wall having an aperture in predetermined relation to said heating units, a griddle disposed on said cooking top and resting upon said heating units, and means for detachably securing said griddle in good heat transfer relation with said heating units, comprising a locating pin extending from said griddle for removable insertion into said wall aperture, and latch means carried by said griddle and engageable with said range body portion to draw said griddle downwardly against said heating elements.

7. The combination according to claim 6, in which said locating pin is disposed at the end of said griddle opposite from said latch means.

8. The combination according to claim 6, in which said wall aperture is so located relative to said cooking top as to require said griddle to be pressed downwardly relative to said cooking top for entry of said locating pin into said aperture.

9. The combination according to claim 6, in which said pin is mounted in said griddle for rotation about an axis parallel to the base of said griddle and its aperture engaging portion is eccentric with respect to said axis, whereby the height of said aperture engaging portion may be adjusted relative to the bottom of said griddle.

10. The combination according to claim 6, in which said locating pin may be located in one of two optional positions relative to a centerline of said griddle.

11. The combination according to claim 6, in which said latch means includes a resilient latching member engageable with said range body portion.

12. In combination, an electric cooking range having a body portion providing a cooking top, an upstanding wall along the rear of said cooking top, a plurality of substantially circular heating units of uniform diameter and substantially identical maximum wattage disposed on said cooking top in mutually spaced relation, a common diameter of said heating units being normal to said upstanding wall, said wall having an aperture in alignment with said common diameter, means for energizing said heating units at a predetermined wattage, a griddle disposed on said heating units, said griddle having on its underside a plurality of bosses of substantially identical elliptical shape in which the minor diameter is not less than the diameter of said heating units, and the major diameter is at right angles to the said common diameter of said heating units, there being a boss for each said heating unit and said bosses maintaining the remainder of said griddle spaced above the said range cooking top, the upper surface of said griddle sloping uniformly downwardly toward a pouring lip at the front end thereof, said lip overhanging the front of said cooking top, means including a pin extending from the rear of said griddle for insertion into said rear wall aperture and latch means secured to said griddle beneath the pouring lip thereof and engageable beneath said cooking top to releasably secure said griddle on said heating units, and a grease receptacle releasably supported by said latch means in spaced relation to the range body portion and extending beneath said pouring lip with no more than line contact therewith to catch grease flow thereover.

13. The combination according to claim 12, in which the slope of said griddle surface is of the order of 1/16 inch per foot and the transition between said griddle surface and said pouring lip comprises a cylindrical surface tangential to said griddle surface and said pouring lip and having a radius of at least 7/16 inch.

14. In combination, an electric cooking range having a body portion providing a cooking top, a pair of substantially circular heating units of uniform diameter disposed on said cooking top in mutually spaced relation, means for individually energizing said heating units at a predetermined wattage, a griddle disposed on said heating units, said griddle having on its underside a boss individual to each said heating unit, means for resiliently maintaining said griddle with the said bosses in pressure contact with the associated heating units, a single thermostat means for simultaneously controlling the energization of both said heating units, and a temperature responsive system in said thermostat means having a sensing head in heat transfer relation with said griddle.

15. The combination according to claim 14, in which said thermostat temperature responsive system includes a sensing head maintained magnetically in contact with the underside of said griddle.

16. The combination according to claim 14, in which the underside of said griddle has a third boss, said third boss having a permanent magnet disposed therein, and said thermostat temperature responsive system has a sensing head having a magnetic element, whereby said sensing head is magnetically attracted to said third boss.

17. The combination according to claim 14, in which said temperature responsive system sensing head is disposed within said range body portion intermediate the said heating units.

References Cited in the file of this patent

UNITED STATES PATENTS

| | | |
|---|---|---|
| Re.20,288 | Schroeder | Mar. 9, 1937 |
| 2,233,463 | Wilson | Mar. 4, 1941 |
| 2,288,510 | Brannon | June 30, 1942 |
| 2,494,061 | Scoville | Jan. 10, 1950 |
| 2,699,487 | Turner | Jan. 11, 1955 |

FOREIGN PATENTS

| | | |
|---|---|---|
| 62,873 | Norway | Sept. 9, 1940 |
| 430,829 | Great Britain | June 26, 1935 |